United States Patent Office 3,517,052
Patented June 23, 1970

3,517,052
RESINS FROM BARK
Theodorus Gerardus Brandts and Joseph Alois Lichtenberger, Grand'Mere, Quebec, Canada, assignors to Consolidated Paper (Bahamas) Limited, a corporation of Bahamas
No Drawing. Continuation-in-part of application Ser. No. 127,507, July 28, 1961. This application July 6, 1966, Ser. No. 563,090
Int. Cl. C07c 69/88
U.S. Cl. 260—473.5                              9 Claims This invention relates to a process of preparing an improved resin-forming material from bark extracts.

This is a continuation-in-part application of Ser. No. 127,507 filed July 28, 1961, now abandoned.

Bark contains phenolic or aldehyde-reactive materials such as tannins and phlobaphenes which are of interest as substitutes for phenols for the manufacture of phenol-formaldehyde resins. These phenol-formaldehyde resins are widely used as moulding powders, in plywood adhesive and other adhesives, as ion exchange resins, as insulating and hard-board binders and strengthening agents, and as binders for laminates and wood particle boards.

It is known that an alkaline extraction of bark material, especially coniferous barks, will yield an alkali-bark derivative which has the capacity of reacting rapidly with formaldehyde and/or with phenol alcohols to form an insoluble, infusible resin. In these extractions or digestions various alkalies have been suggested and tried such as sodium hydroxide, potassium hydroxide, ammonium hydroxide, sodium sulfide, etc. While the present invention will be described mainly in terms of the sodium hydroxide extraction, it is to be considered as applying equally well to similar alkaline extracted bark derivatives.

One of the main problems with the known art of making resins from bark extracts is that after an alkaline extraction the viscosity of the extract is often both too high and too difficult to control for a reasonable solids content. In plywood manufacture, for example, the glue has to be manageable for a certain time span so that it can be spread on the wood, and the viscosity cannot be controlled simply by dilution with water, because an excessive amount of water in the assembled plywood would give rise to trouble in the pressing-curing operation. In the manufacture of particle board, an even distribution of glue on the particles can only be achieved with glue of low viscosity which can be readily sprayed without blocking and fouling the equipment.

One of the main objects of the present invention is therefore, to improve the viscosity characteristics of alkaline-bark resin derivatives.

To enhance the value of bark resin derivatives it is also important that the adhesive or binding properties be improved, by so doing, they may then be able to compete with other higher strength and more expensive resins.

Another main object of the present invention, therefore, is to improve the bonding characteristics of alkaline-bark resin derivatives.

Known processes for extracting phenolic-type or aldehyde-reactive materials from bark include those of digesting bark at an elevated temperature in an aqueous solution of sodium or potassium hydroxide. An amount of unwanted polymeric aldehyde unreactive material is normally dissolved or extracted along with the aldehyde-reactive material even when the reaction is carefully controlled, and such contamination interferes with the most advantageous use of the aldehyde-reactive materials according to the present invention.

A further object of the present invention is to provide a process of improving the quality of these resin-forming materials from bark extracts by substantially eliminating undesirable, aldehyde unreactive materials.

It has been found that by heating an alkaline bark extract which has been first separated from the residual bark component at a high temperature for a reasonable length of time, chemical reactions take place which make it possible (after a precipitation step, if necessary) to obtain a phenolic material having superior resin forming properties.

It would appear that this additional "heat treatment" of alkaline bark extracts involves an alkaline hydrolysis and polysaccharide degradation, probably along the lines of the following: glycosides are hydrolzed and the phenolic aglycones set free as the temperature increases. At the same time the glycosidic bonds of carbohydrate polymers are cleaved exposing additional reducing groups to the action of alkali. The glycosidic bonds joining uronic acid to the rest of the polymer are especially rapidly cleaved by alkali at 150° C. and higher, resulting in the formation of pentosans. At the temperature of the heat treatment, uronic acid is completely destroyed and broken down mainly into carbon dioxide and water. The polyuronides such as pectic acid disappear in less than one hour under alkaline conditions at 160° C. Other carbohydrates such as glucomannan and galacto-glucomannan are more resistant to alkali degradation and may persist. Reducing sugars may be converted to lactic acid. The formation and liberation of organic acids and carbon dioxide contribute to the lowering of the pH during the heat treatment.

This cleavage by high temperature degradation, however, still leaves all of the products together in chemical solution, and if necessary, they should be separated by acid precipitation and subsequent washing, otherwise, the carbohydrates, for example, would stay water-soluble if not removed and detrimentally affect the properties of any resulting adhesive product.

The present invention generally comprises heating a bark extract containing aldehyde-reactive material and aldehyde-unreactive material, part of said aldehyde-unreactive material being in the form of high molecular weight polysaccharide-type compounds, and part of said aldehyde-reactive material being combined with aldehyde-unreactive material, in an alkaline medium at an alkaline pH at a temperature and time sufficient to essentially liberate in solution in a molecular sense, the said aldehyde-reactive material from chemical combination with said aldehyde-unreactive material, and to essentially degrade the high molecular weight polysaccharide material to lower molecular weight material. The freed aldehyde-reactive phenolics may then be separated from the aldehyde-unreactive material by precipitating (preferably in an acid media) the aldehyde-reactive material in an insoluble form, filtering off the insoluble aldehyde-reactive material and washing it free of soluble aldehyde-unreactive material.

It is also desirable to separate the bark extract from the insoluble bark residue before subjecting it to the heat treatment and separation according to this invention, since this initial separation will also serve to get rid of materials undesirable in a useful end product.

If extraction is made with an excess of alkali, the extractives may contain relatively large amounts of aldehyde-unreactive fatty acids (e.g., arachidic) and phenolic (ferulic) acid soaps as well as lignin-like material with a high methoxy but low phenolic hydroxyl content, which materials would not be separated from the aldehyde-reactive phenolics on acid precipitation.

The degree of separation and purification necessary will depend on the end use of the product and to the proportion of aldehyde-unreactive material originally present in the bark material. Where the aldehyde-unreactive material seriously interferes with the usefulness or effectiveness of the aldehyde-reactive material then the various separation steps of precipitation and filter (and washing) would be essential to give the required results.

This purified and separated aldehyde reactive material may then be reacted with formaldehyde and/or phenol alcohols to form the desired insoluble, infusible resin, as will be further described hereinafter.

The degradation of the high molecular weight aldehyde-unreactive material is necessary in order to reduce the viscosity of the extracts which in turn is necessary to make the extracts commercially useable in certain applications and to set free the phenolic aglycones.

During the heat treatment of the invention, the time and the temperature are interdependent, so that the higher the temperature the shorter the time required. Which set of temperature-time conditions that are chosen will depend on such factors as the type of bark being extracted, the quality of product desired, as well as certain economic considerations. In general, for economic reasons, the temperature should probably be above 140° C. Reasonable resins have been produced in a time range of 5 minutes to 180 minutes and from 150° to 225° C. On the other hand, very long periods of time combined with lower temperatures can also lead to satisfactory resins.

The conditions of alkalinity should be such as to bring about the type of alkaline degradation described above. No special pH levels are essential and although the pH preferably should be kept above 6, it is only necessary to see that the pH of the extract during at least the early stages of heat treatment remains on the alkaline side. Towards the end of the treatment it is possible, though not desirable, to let the pH fall slightly on the acid side. Generally, therefore the pH should be alkaline and not allowed to fall below 6-7 for any length of time. The avoidance of acid conditions would be especially true for extracts containing sugars which in acid medium could be converted into aldehydes, such as furfural, and which would in turn react with the phenolics. What the actual pH would be throughout the heat treatment would depend on the amount of alkali used to extract the bark, the time-temperature schedule and the type of bark, etc. If it were found that the pH tended to drop to the acid side, the pH can be easily adjusted by the addition of more alkali and/or the proper release of the carbon dioxide formed during the heat treatment.

The barks tested and found to have useful properties according to the invention are the following:

White spruce (*Picea glauca*); red spruce (*Picea rubra*); black spruce (*Picea mariana*); balsam fir (*Abies balsamea*); jackpine (*Pinus banksiana*); white pine (*Pinus strobus*); red pine (*Pinus resinosa*); and eastern hemlock (*Tsuga canadensis*).

From known publications such as the first edition of the text entitled "Properties of Pulpwood" by Irving H. Isenberg, Institute of Paper Chemistry, dated September 1943, it will be apparent that the above species are all found in the eastern portion only of North America and not on the west coast.

Further information on the preliminary extraction may be obtained from the known literature such as U.S. Pat. No. 2,782,241, dated Feb. 19, 1957 to Gray et al. and U.S. Pat. No. 2,890,231, dated June 9, 1959 to Heritage et al. It should be observed that the bark species referred to in the examples in the Gray et al. reference are found only in the western portion of North America with the exception of Southern yellow pine which is found in the South and the patentee was there working with different wood species than shown in the prior art.

The step of precipitating phenolics is known, and it is preferable in the practice of the present invention to use a mineral acid such as sulphuric acid.

While the filtering step may be done in several known ways, e.g., through use of filter presses, leaf filters, or rotary continuous filters, it is preferable to employ centrifuging means to separate the precipitated aldehyde-reactive materials from the mother liquid.

The washing step after precipitation and filtration is important insofar as it removes much of the dissolved undesirable solids contained in the moisture of the filter cake and improves substantially the purity of the phenolic material.

The following examples serve to illustrate the process of this invention, it being understood, however, that the invention is not limited to any of these specific conditions set forth in these examples. Except where mentioned otherwise, the bark material use in these examples consisted of barking drum waste composed of approximately 50% balsam and 50% spruce bark (as hereinbefore defined). This material was air-dried to approximately 35% moisture, passed through a hammermill equipped with a screen having a ½" perforation and air-dried to approximately 10% moisture content. The drying was performed to prevent deterioration of the sample. In practice, however, the wet bark from the barking drums (after a disintegration) would be in a form suitable for extraction.

EXAMPLE 1

The effect of the heat treatment on the pH, percent solids, and viscosity of the extracts 1000 grams (oven dry basis) of bark was digested in 4000 grams of water to which was added the required amount of sodium hydroxide. The digestion was for 2 hours at 90° C. (with constant stirring). Direct steam was used to maintain the temperature, the condensation resulting from this method of heating contributed to an increase in the bark to liquor ratio from 1:4 to 1:5. Following this digestion or extraction, the bark mass was centrifuged to yield an alkali-bark extract. The extract was then heated in an autoclave for the required time at the desired temperature (see Tables I and II). Carbon dioxide and water were liberated during this heat treatment. The extract was then cooled to room temperature and the required tests made. Table I shows the effect of the heat treatment on pH and on percent solids, and Table II shows the effect of the heat treatment on the viscosity of the extracts.

Viscosity measurements were determined using the Brookfield viscosimeter and the results are expressed in centipoises (cps.) at a temperature of 22° C.

TABLE I

| Extraction, g. NaOH/1,000 g. bark | Heat Treatment | | Effect of heat treatment | | | |
|---|---|---|---|---|---|---|
| | Time, min. | Temp., °C. | pH | | Solids, percent | |
| | | | Before | After | Before | After |
| 40 | 60 | 180 | 8.7 | 6.4 | 2.3 | 2.1 |
| 60 | 60 | 180 | 9.7 | 7.1 | 3.8 | 3.5 |
| 80 | 60 | 172 | 10.0 | 8.1 | 5.2 | 4.8 |
| 100 | 60 | 174 | 10.6 | 8.8 | 5.9 | 5.5 |
| 120 | 60 | 178 | 11.1 | 9.1 | 6.9 | 6.3 |

TABLE II

| Extraction, g. NaOH/1,000 g. bark | Before heat treatment | | Heat treatment | | After heat treatment | |
|---|---|---|---|---|---|---|
| | pH | Viscosity at 20% solids cps. | °C. | Mins. | pH | Viscosity at 25% solids cps. |
| 40 | 8.6 | 10,000 | 176 | 30 | 6.5 | 128 |
| 40 | 8.6 | 10,000 | 178 | 120 | 6.1 | 28 |

As Tables I and II indicate, while the heat treatment leads to a lowering of the pH, the most significant effect is a greatly reduced viscosity of the alkaline bark extracts. Without this decrease in viscosity, these extracts would be unuseable in many commercial applications, e.g., plywood adhesives, and particle board resins. This situation holds true even if an attempt were made to purify the aldehyde-reactive material by simple precipitation (see Example 2).

EXAMPLE 2

Effect of heat treatment and acid precipitation on viscosity of extracts

Extracts were prepared as described in Example 1, which were "heat treated" (where applicable) for 60 minutes at the same temperatures shown in Example 1. The extracts were precipitated with sulphuric acid at about 90° C. The precipitates were filtered and washed and then dissolved in sodium hydroxide and the viscosities determined at 25% solids.

The results are given in Table III. The term "Raw Yield" refers to the amount of solids in the extract right after extraction. It includes the phenolics as well as all the undesirable carbohydrates, etc., which are to be removed during the purification of the extract. As will be noted, the acid precipitation alone does not sufficiently reduce the viscosity of the extracts to make them useful as adhesives. It is necessary to first heat treat these extracts.

TABLE III

| Extraction | | | Non-heat treated but acid precipitated | Heat treated and acid precipitated |
|---|---|---|---|---|
| g. NaOH/1,000 g. bark | Raw yield percent | pH | Viscosity at 25% solids, cps. | Viscosity at 25% solids, cps. |
| 90 | 33.5 | 9.3 | 2,300 | 34 |
| 120 | 34.5 | 9.4 | 1,600 | 25 |

EXAMPLE 3

Quality of the resin after heat treatment (A) Effect of the precipitation.—Besides noting the viscosity changes, the bonding characteristics of the bark extract were assessed by the plywood boil test described in ASTM D 906–49 and U.S. Commercial Standard CS 35–56. Because the viscosity of the extracts before heat treatment was too high, it was impractical to assess the bonding characteristics of the extract at this stage. Essenially, therefore, the heat treatment makes it possible to use these bark extracts in the manufacture of plywoods and particle boards.

The extract, before precipitation or after precipitation and dissolving in sodium hydroxide, was concentrated to 25% or 40% solids (depending on the viscosity). The thickened purified extract was then mixed with polymethylol phenol (hereinafter referred to simply as PMP) in a solids ratio of 1.35 extract to 1.00 PMP solids.

The PMP was prepared by mixing together crystalline phenol and 37% aqueous formaldehyde in the proportions by weight of approximately 1.2 phenol:1, (formaldehyde pure). After cooling to 22° C., sodium hydroxide (38%) was added so that the proportions by weight of the pure solids were now 1:0.83:0.32 (phenol:formaldehyde:sodium hydroxide) or a mole ratio of 1:2.6:0.75). The temperature rose to approximately 90° C. 15 minutes after the addition of the sodium hydroxide solution. The temperature was maintained at 90° C. for an additional 20 minutes; after which, the PMP solution was cooled to room temperature and stored under refrigeration. Solids content of various batches varied from 44 to 46%; viscosities varied from 36 to 46 centipoises. It is to be noted that the ratio of the solids (oven-dry) before the reaction to that after the reaction is 1.18:1; this is due to a loss of solids in accordance with the Cannizzaro reaction and the formation of condensation water. The above phenol alcohol formulation is in accordance with prior art (e.g., see "The Chemistry of Phenolic Resins" by R. W. Martin and an article entitled "Thermosetting Adhesives from Bark Extracts" published in the October issue, 1958 of the Forest Products Journal).

The mixture of extract and PMP was then vacuum-concentrated to 50% solids. The viscosity of this 50% glue mixture was then determined at 25° C. To 60 grams of this mixture was added 3 grams of −100 mesh birch wood flour. This adhesive (purified extract, PMP, and wood flour) was then applied to rotary-cut-evenly-grained-birch veneer to form a 3-ply laminate. The grain of the two outside sheets was parallel-oriented, the center was 90° off this direction. The adhesive was applied at the rate of 3.2 grams per side (12.8 grams on all four sides to be joined); this amounts to 32 lbs./1000 sq. ft. of glue line. The curing was done in a hydraulic press at 300° F. and 200 p.s.i.g. for 8 minutes. The plywood was then tested by the plywood boil method mentioned above. In the tables the term "p.s.i. (corr.)" refers to a correction which is made to the test values involving plywood made from extra thin veneer.

Values for these tests, including process conditions for the extraction are given in Table IV.

TABLE IV

| Extraction | | | | | Viscosity at 25% solids, cps. | Plywood boil test | | |
|---|---|---|---|---|---|---|---|---|
| g. NaOH/ 1,000 g. bark | Time, min. | Temperature, ° C. | Raw Yield, percent | Precipitated | | Yield, percent | P.s.i. (corr.) | Wood failure, percent |
| 40 | 120 | 95 | 15.6 | No | 38 | 14.5 | 254 | 26 |
| 40 | 120 | 95 | 15.6 | Yes | 51 | 8.7 | 303 | 77 |
| 60 | 120 | 95 | 25.0 | No | 39 | 20.7 | 310 | 2 |
| 60 | 120 | 95 | 25.0 | Yes | 51 | 13.9 | 340 | 61 |
| 60 | 60 | 95 | 25.5 | No | 53 | 24.0 | 269 | 30 |
| 60 | 60 | 95 | 25.5 | Yes | 34 | 14.3 | 282 | 73 |
| 80 | 120 | 95 | 27.6 | No | 38 | 24.7 | 268 | 7 |
| 80 | 120 | 95 | 27.5 | Yes | 27 | 12.3 | 365 | 30 |
| 140 | 120 | 95 | 43.1 | No | 26 | 35.2 | 236 | 3 |
| 140 | 120 | 95 | 43.1 | Yes | 97 | 20.9 | 261 | 30 |

The subsequent heat treatment of the extracts was for 1 hour at 175–180° C. (not shown), and the precipitation was carried out at a pH of 2.5 and at 90° C. The standards established in U.S. Commercial Standard CS 35–56 are, for example, as follows:

| Average shear strength, lbs./sq. inch (p.s.i.) | Minimum wood failure, percent | Average wood failure, percent |
|---|---|---|
| Under 250 | 25 | 50 |
| 250–350 | 10 | 30 |
| Above 350 | 10 | 15 |

As will be noted, the values after precipitation are up to the standard while those without precipitation are generally not up to standard.

(B) The effect of the amount of alkali used during extraction.—In order to establish how much alkali is necessary to produce the most favourable extraction conditions, tests were made with various alkali concentrations ranging from 40 to 140 grams of sodium hydroxide per 1000 grams of bark. The extraction time was kept constant at 120 min., the temperature at 95° C. The heat treatment was for 1 hour at 175° to 180° C. The precipitation purification step was conducted at pH 2.5 and 90° C.

The sodium is determined in the solids by burning off the organic matter at 700 to 800° C. and then, after cooling to room temperature, converting all the ash into sulphate salt. It is assumed that all the present inorganic solids are then in the form of sodium sulphate. The term "raw yield" is defined above (Example 2). The yield of sodium salt represents the useful phenolic material in the form of sodium salt and phenolates. The yield of organic matter is calculated by substraction of the sodium from the sodium salt and phenolate.

Table V shows the results of these tests:

The bark was extracted with 60 grams of sodium hydroxide per 1000 grams of O.D. bark for two hours at 95° C. The purification of the heat-treated extracts consisted of an acid precipitation and washing of the filter cake as described above.

TABLE V

| g. NaOH/ 1,000 g. bark | pH | Raw extract | | Heat-treated, precipitated, redissolved and concentrated extract | | | | Plywood boil test | | | | | |
|---|---|---|---|---|---|---|---|---|---|---|---|---|---|
| | | Solids, percent | Yield, percent | Viscosity at 25% solids, cps. (22° C.) | Na, percent | Yield | | 6 minutes curing | | 8 minutes curing | | 10 minutes curing | |
| | | | | | | Na-salt, percent | Organic matter, percent | P.s.i. (corr.) | Wood failure, percent | P.s.i. (corr.) | Wood failure, percent | P.s.i. (corr.) | Wood failure, percent |
| 40 | 8.7 | 3.75 | 15.6 | 51 | 10.9 | 8.7 | 7.8 | | | 303 | 77 | | |
| 60 | 9.4 | 4.50 | 25.0 | 51 | 10.8 | 13.9 | 12.4 | | | 340 | 61 | | |
| 80 | 9.9 | 5.20 | 27.5 | 27 | 10.7 | 12.3 | 11.0 | 371 | 48 | 365 | 33 | 378 | 22 |
| 90 | 10.2 | 5.40 | 31.2 | 21 | 10.5 | 16.3 | 14.6 | 335 | 27 | 326 | 13 | 333 | 29 |
| 120 | 11.1 | 6.90 | 38.0 | 20 | 10.3 | 21.6 | 19.4 | 310 | 0 | 299 | 0 | 315 | 0 |
| 140 | 11.4 | 7.30 | 43.1 | 67 | 12.0 | 20.9 | 18.4 | | | 261 | 37 | | |

If one compares the yield of organic matter of the different extractions with the properties of the glue made therefrom (expressed in p.s.i. tensile strength) it becomes clear that the strength remains good with increasing sodium hydroxide concentrations up to about 80 grams of NaOH/1000 grams of bark. With any further increase of the NaOH concentration the yield goes up but the quality of the glue falls off. This means there is an upper limit to the NaOH concentration in the extraction of useful phenolics. It is apparent that when more sodium hydroxide is used, undesirable material is extracted which is not removed by the subsequent purification. It can also be noted that a curing time of 6 min. at the specified conditions is sufficient. However, to be sure that complete curing was achieved, 8 min. was generally used.

(C) Effect of washing the precipitate.—In a further effort to improve the final product a multiple washing was applied to the acid precipitate in order to remove as much as possible of the dissolved, undesirable solids. The acid filter cake normally contains about 80% water in which carbohydrate degradation material as well as sodium sulphate is dissolved.

The effect of the washing procedure is shown in Table VI.

TABLE VII

| Heat treatment | | Heat-treated extract | | | Plywood Boil test | |
|---|---|---|---|---|---|---|
| Time, min. | Temperature, ° C. | Solids, percent | pH | Final yield, percent | P.s.i. (corr.) | Wood failure, percent |
| 15 | 175 | 4.2 | 8.0 | 10.5 | 352 | 4 |
| 30 | 175 | 3.9 | 7.3 | 11.1 | 356 | 46 |
| 60 | 176 | 4.0 | 6.9 | 11.2 | 364 | 43 |
| 90 | 176 | 3.9 | 6.8 | 11.5 | 371 | 38 |
| 180 | 176 | 3.8 | 6.8 | 11.7 | 405 | 31 |
| 300 | 178 | 3.8 | 6.8 | 11.6 | 333 | 34 |

As the results indicate, the extracts which were heated for 30 minutes or more yield plywood adhesives with average tensile strengths and wood failure in excess of the requirements specified for boil-proof exterior type plywood, in Commercial Standard CS 35–56. However, there appears to be a slight increase in tensile strength with prolonged heating up to about 2 hours. The drop in pH and solids content levels off at about 60 to 90 minutes of heating which suggests that the carbohydrate breakdown has come to an end by that time. Workable viscosities were obtained after 15 minutes autoclaving and further heating gave only a slight reduction in viscosity.

TABLE VI.—PURIFICATION

| | Extraction | | | Heat treatment | | Precipitation and washing | | | Plywood boil test | |
|---|---|---|---|---|---|---|---|---|---|---|
| g. NaOH/ 1,000 g. bark | Time, min. | Temperature, ° C. | Yield, percent | Time, min. | Temperature, ° C. | Washing | Yield after Precipitation, percent | Yield after Washing, percent | p.s.i. (corr.) | Wood Failure percent |
| 60 | 120 | 95 | 25 | 90 | 175 | Yes | 15.9 | 11.3 | 365 | 35 |
| 60 | 120 | 95 | 25 | 90 | 175 | No | 15.9 | | 296 | 0 |

As will be noted washing of the acid filter cake improves the quality of the phenolic material considerably.

(D) Effect of heat treatment time.—As mentioned above the question of the time-temperature-schedule for heat treatment depends on several factors, e.g. type of bark, economic considerations, etc. However, to illustrate the effect of time on the quality of the resins, Table VII lists changes in the quality that take place when a spruce-balsam extract is heated at one temperature level and various times.

(E) Bark resins from specific species.—Samples of hemlock, spruce, balsam and pine barks (as hereinbefore defined) were processed as described above for the barking waste spruce-balsam mixture.

The barks were extracted with 60 grams NaOH per 1000 grams bark at 95° C. for two hours. The bark-liquor ratio was varied from 1:5 to 1:10. The extracts were heated for one hour at 175° C., precipitated and washed as described above.

There was a marked difference in the precipitation and filtration rates of the various extracts. Hemlock and especially pine bark extracts gave coarse and well-agglomerated acid precipitates which were easily filtered and washed; balsam bark extract was slightly more difficult to handle than hemlock and some bleeding of fine particles was in evidence.

Spruce bark extracts, however, gave fine acid precipitates which rapidly plugged the filter media resulting in very low filtration rates. The filtration rate can be greatly improved by a short boiling cycle of the suspended precipitate or through the use of centrifuge techniques.

The results of these tests are summarized in Table VIII.

Although plywood adhesives of good quality can be made from all four bark species, pine and hemlock are preferred because of relatively high yields, ease of processing, as well as better boil resistance, of the adhesive bonds.

meet the commercial standards for plywood adhesive use.

The data in Table IX, Part B shows the results obtained when the amounts of both the phenol and the formaldehyde are lowered while the ratio phenol to formaldehyde remains constant. (This is equivalent to using less PMP per unit quantity of bark extract.) Again, as can be seen, the amounts of these chemicals can be lowered substantially and the quality of the adhesive bonds maintained.

TABLE IX

| Group | Ratios | | | | Plywood boil test | | Comments: |
| --- | --- | --- | --- | --- | --- | --- | --- |
| | Bark extract phenol | Bark extract formaldehyde | Bark extract PMP solids | Phenol formaldehyde | p.s.i., (corr.) | Wood failure percent | |
| A | 1:0.41 | 1:0.33 | 1:0.74 | 1.22 | 354 | 33 | Extra formaldehyde was added with the PMP to maintain a constant ratio of bark extract formaldehyde. |
| | 1:0.33 | 1:0.33 | 1:0.61 | 1.00 | 386 | 35 | |
| | 1:0.28 | 1:0.33 | 1:0.50 | 0.83 | 372 | 39 | |
| | 1:0.22 | 1:0.33 | 1:0.40 | 0.66 | 360 | 34 | |
| | 1:0.18 | 1:0.33 | 1:0.33 | 0.55 | 327 | 54 | |
| | 1:0.12 | 1:0.33 | 1:0.25 | 0.37 | 310 | 42 | |
| | 1:0.09 | 1:0.33 | 1:0.17 | 0.28 | 240 | 49 | |
| B | 1:0.41 | 1:0.33 | 1:0.74 | 1.22 | 401 | 55 | |
| | 1:0.33 | 1:0.27 | 1:0.61 | 1.22 | 354 | 60 | |
| | 1:0.28 | 1:0.23 | 1:0.50 | 1.22 | 344 | 28 | |
| | 1:0.22 | 1:0.18 | 1:0.40 | 1.22 | 330 | 62 | |
| | 1:0.18 | 1:0.15 | 1:0.33 | 1.22 | 261 | 81 | |
| | 1:0.16 | 1:0.11 | 1:0.29 | 1.22 | 366 | 16 | |
| | 1:0.12 | 1:0.08 | 1:0.22 | 1.22 | 245 | 10 | |

TABLE VIII

| Bark species | Raw extract | | | | Heat treatment plus precipitation and washing | | | | Final extract | | | Adhesive Viscosity, cps. at 50% solids | Plywood boil test | |
| --- | --- | --- | --- | --- | --- | --- | --- | --- | --- | --- | --- | --- | --- | --- |
| | Final bark/liquor ratio | Solids, percent | pH | Yield, percent | Time, min. | Temperature, °C. | Solids, percent | pH | Yield, percent | Viscosity, cps. at 25% solids | | | P.s.i. (corr.) | Wood failure, percent |
| Balsam | 1:8 | 3.7 | 9.7 | 29.2 | 60 | 175 | 3.0 | 7.1 | 9.1 | 21 | | 1,560 | 331 | 27 |
| Spruce | 1:7 | 3.0 | 9.7 | 23.7 | 60 | 175 | 2.9 | 7.6 | 9.3 | 25 | | 5,150 | 344 | 28 |
| Pine | 1:7 | 4.1 | 9.4 | 26.4 | 60 | 178 | 3.9 | 7.4 | 11.9 | 30 | | 2,750 | 345 | 75 |
| Hemlock | 1:5 | 4.5 | 9.1 | 23.0 | 60 | 178 | 4.1 | 7.5 | 8.0 | 35 | | 2,120 | 340 | 53 |

(F) Resins for various ratios of bark extract to phenol and phenol to formaldehyde.—In the above examples, the weight ratio of bark extract to PMP was 1:0.74 and the ratio of bark extract to phenol (present in the completed PMP) was 1:0.41. Ratio for the formaldehyde, etc., can be calculated from the data found under Example 3A above, keeping in mind the loss of solids during the PMP reaction. These were the ratios that were generally used in prior art, and similar ratios were used herein to gauge the advance of the present invention over the prior art.

Consideration was given to the question as to how much of the non-bark chemicals (phenol and formaldehyde) one could leave out and still obtain satisfactory results. This is particularly important for the phenol component of the PMP, as it is a much more expensive source of aldehyde-reactive material than the bark extract.

The data in Table IX, Part A shows the results obtained when the ratio of bark extract to phenol was changed while the ratio bark extract to formaldehyde remains constant. In the column of figures for the ratio of phenol to formaldehyde, the figure for phenol only is given on the basis of 1 part formaldehyde. As can be seen the amount of phenol can be lowered to where the ratio is approximately 1:0.10 and the quality of the resin still

What we claim as our invention is:

1. The process of preparing a purified aldehydereactive resin-forming bark derivative from bark material which comprises extracting bark selected from the group consisting of white spruce, red spruce, black spruce, balsam fir, jackpine, white pine, red pine, and eastern hemlock, with an aqueous solution of an alkali, at a temperature not greater than 95° C., separating the extracted material from the insoluble bark residue to yield an alkaline bark extract containing aldehyde-reactive material and aldehyde-unreactive material, part of said aldehyde-unreactive material being in the form of high molecular weight polysaccharide-type compounds, and part of said aldehyde-reactive material being combined with aldehyde-unreactive material, heating said bark extract at an alkaline pH at a temperature of at least 140° C. and for a time of at least 5 minutes and sufficient to liberate in solution said aldehyde-reactive material from chemical combination with said aldehyde-unreactive material and to essentially degrade said high molecular weight polysaccharide-type compounds to lower molecular weight material, lowering the pH of the heated bark extract to precipitate aldehyde-reactive material, and separating the precipitated aldehyde-reactive material from the aldehyde-unreactive material.

2. A process according to claim 1 including the step of releasing carbon dioxide gas during the heating of said bark extract to maintain an alkaline pH during the heating of said bark extract.

3. A process according to claim 1 including the step of adding further alkali to said bark extract to maintain an alkaline pH during the heating of said bark extract.

4. A process according to claim 1 wherein the bark extract is heated for a time of from 5 to 180 minutes at a temperature of from 150 to 225° C.

5. A process as claimed in claim 1 wherein the aldehyde-reactive material is separated from the aldehyde-reactive material by precipitation with a mineral acid.

6. A process as claimed in claim 5 wherein the mineral acid is sulphuric acid.

7. A process as claimed in claim 1 wherein the bark extract is heated at a temperature of from 140° to 225° C.

8. A process as claimed in claim 5 wherein the bark material is first extracted in an aqueous alkaline solution of a concentration of not more than 80 grams sodium hydroxide to 1,000 grams bark.

9. The product prepared by the process of claim 1.

References Cited

UNITED STATES PATENTS

| | | | |
|---|---|---|---|
| 2,845,450 | 7/1958 | Anderson et al. | 260—473.5 |
| 2,819,295 | 1/1958 | Herrick et al. | 260—473.6 |
| 2,782,241 | 2/1957 | Gray et al. | 260—473.6 |
| 3,025,250 | 3/1962 | Herrick et al. | 260—17.2 |
| 3,053,784 | 10/1962 | Herrick et al. | 260—57 |

LORRAINE A. WEINBERGER, Primary Examiner

D. E. STENZEL, Assistant Examiner

U.S. Cl. X.R.

260—473.6